United States Patent
Saito et al.

(10) Patent No.: US 7,673,454 B2
(45) Date of Patent: Mar. 9, 2010

(54) COMBUSTOR OF GAS TURBINE AND COMBUSTION CONTROL METHOD FOR GAS TURBINE

(75) Inventors: Keijiro Saito, Takasago (JP); Satoshi Tanimura, Takasago (JP); Atsushi Yuasa, Takasago (JP); Toshihiko Saito, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 470 days.

(21) Appl. No.: 11/700,214

(22) Filed: Jan. 31, 2007

(65) Prior Publication Data

US 2007/0227156 A1 Oct. 4, 2007

(30) Foreign Application Priority Data

Mar. 30, 2006 (JP) ............................. 2006-093166

(51) Int. Cl.
*F02C 3/00* (2006.01)

(52) U.S. Cl. ........................................... 60/737; 60/748

(58) Field of Classification Search ................... 60/737, 60/738, 746–748
See application file for complete search history.

(56) References Cited

U.S. PATENT DOCUMENTS

| | | | |
|---|---|---|---|
| 5,351,477 A * | 10/1994 | Joshi et al. | 60/39.463 |
| 5,511,375 A * | 4/1996 | Joshi et al. | 60/39.463 |
| 6,250,063 B1 | 6/2001 | Davis, Jr. et al. | |
| 6,993,916 B2 * | 2/2006 | Johnson et al. | 60/776 |
| 7,140,560 B2 * | 11/2006 | Stotts et al. | 239/461 |
| 2004/0148936 A1 * | 8/2004 | Moriya et al. | 60/737 |
| 2005/0268616 A1 * | 12/2005 | Widener | 60/776 |
| 2005/0268618 A1 | 12/2005 | Johnson et al. | |
| 2006/0236700 A1 * | 10/2006 | Saitoh et al. | 60/737 |

FOREIGN PATENT DOCUMENTS

| | | |
|---|---|---|
| CN | 1707163 A | 12/2005 |
| EP | 0 974 789 A1 | 1/2000 |
| EP | 1 531 305 A1 | 5/2005 |
| JP | 5-195822 A | 8/1993 |
| JP | 7-12340 A | 1/1995 |
| JP | 8-261465 A | 10/1996 |
| JP | 11-14055 A | 1/1999 |

* cited by examiner

*Primary Examiner*—Michael Cuff
*Assistant Examiner*—Phutthiwat Wongwian
(74) *Attorney, Agent, or Firm*—Birch, Stewart, Kolasch & Birch, LLP

(57) ABSTRACT

In a combustor, divisional fluid passages of a first group, and divisional fluid passages of a second group are present on an inner peripheral side, and divisional fluid passages are also present on an outer peripheral side, and swirl air flows are gushed from the divisional fluid passages. When the total amount of fuel supplied to the combustor is small as in a speed increasing state or in a low load state, fuel is injected only into the divisional fluid passages of the first group. Since a fuel injection region is limited to a position on the inner peripheral side, particularly, a specific position, the concentration of a fuel gas comprising a mixture of fuel and air is lean, but is higher than a flammability limit concentration, even when the total amount of fuel is small.

4 Claims, 11 Drawing Sheets

Rotational Speed

Flow Rate of Fuel in First Group

Flow Rate of Fuel in Second Group

Flow Rate of Fuel in Third Group

Total Amount of Fuel

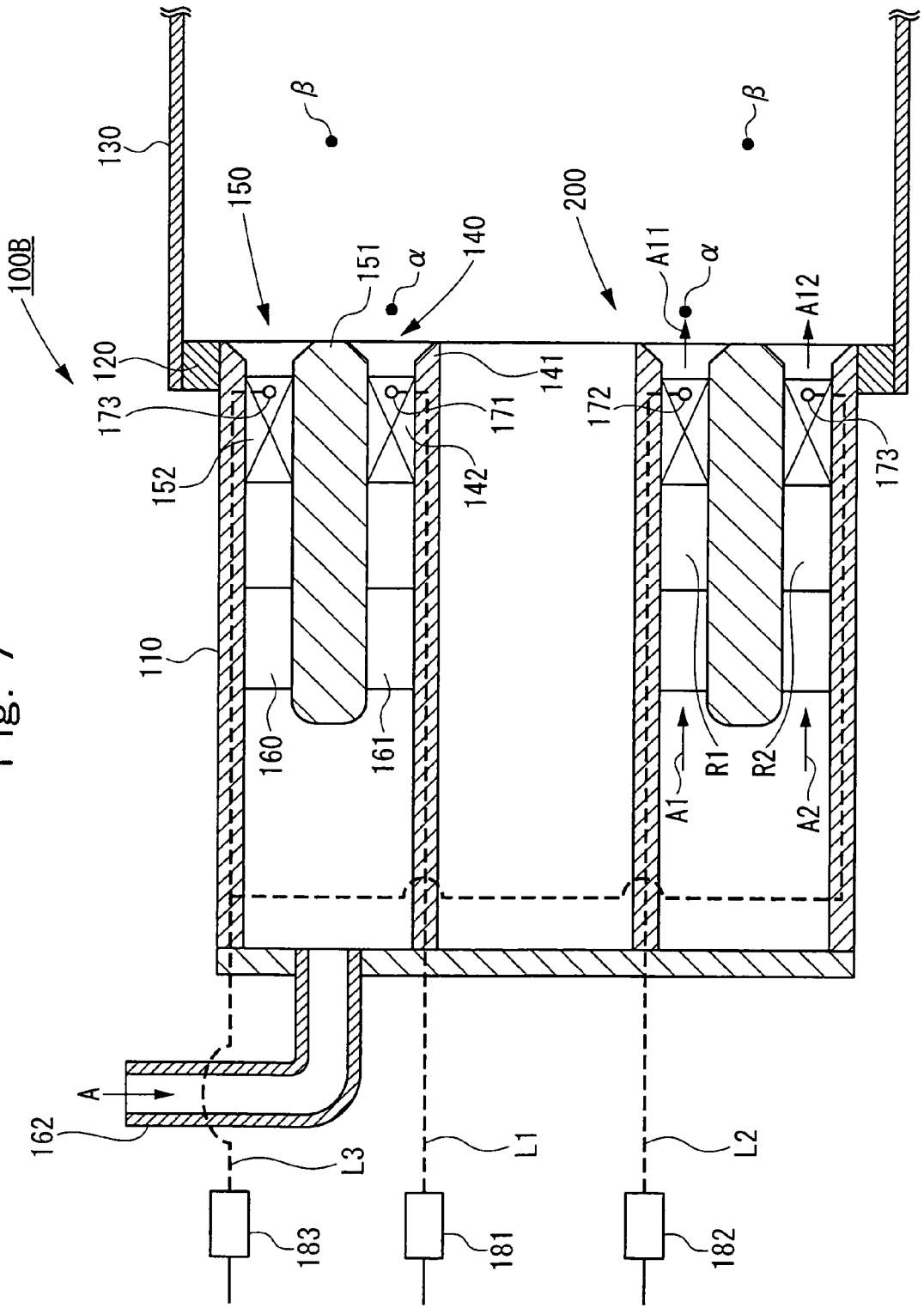

COMBUSTOR OF GAS TURBINE AND COMBUSTION CONTROL METHOD FOR GAS TURBINE

BACKGROUND OF THE INVENTION

1. Field of the Invention

This invention relates to a combustor of a gas turbine, and a combustion control method for a gas turbine, the combustor and the combustion control method being designed to be capable of ensuring stable combustion and suppressing the occurrence of unburned fuel.

More particularly, the combustor and the combustion control method are designed to improve flame holding properties, and suppress the occurrence of unburned fuel, during an operation in which the amount of fuel supplied to the combustor is small, as in a speed increasing state or in a low load state.

2. Description of the Related Art

A gas turbine used in power generation, etc. is composed of a compressor, a combustor, and a turbine as main members. The gas turbine often has a plurality of combustors, and mixes air, which is compressed by the compressor, with fuel supplied to the combustors, and burns the mixture in each combustor to generate a high temperature combustion gas. This high temperature combustion gas is supplied to the turbine to drive the turbine rotationally.

An example of the combustor of a conventional gas turbine will be described with reference to FIG. 10.

As shown in FIG. 10, a plurality of combustors 10 of this gas turbine are arranged annularly in a combustor casing 11 (only one combustor is shown in FIG. 10). The combustor casing 11 and a gas turbine casing 12 are full of compressed air to form a casing 13.

Air, which has been compressed by a compressor, is introduced into this casing 13. The introduced compressed air enters the interior of the combustor 10 through an air inlet 14 provided in an upstream portion of the combustor 10. In the interior of an inner tube 15 of the combustor 10, fuel supplied from fuel nozzles 16 and compressed air are mixed and burned. A combustion gas produced by combustion is passed through a transition pipe 17, and supplied toward a turbine room to rotate a turbine rotor.

In recent years, environmental restrictions have been tightened, and various improvements have been made to decrease the concentration of $NO_x$ (nitrogen oxides) in an exhaust gas from a gas turbine. The so-called rich-lean combustion process is known as a gas turbine combustion technology intended to curtail the occurrence of $NO_x$.

With the rich-lean combustion process, combustion in a fuel-rich state (i.e., rich state) is performed in a first combustion region (in the example of FIG. 10, for example, the region in a middle portion of the internal space of the inner tube 15), while combustion in a fuel-lean state (i.e., lean state) is performed in a second combustion region (in the example of FIG. 10, for example, the region in a peripheral edge portion of the internal space of the inner tube 15). In this case, the fuel-air ratio in the entire combustor (the total fuel-air ratio which is the average of the rich state and the lean state) is controlled to a value commensurate with the operating state of (load on) the gas turbine. When such rich-lean combustion is carried out, completely diffusive combustion (combustion in the complete absence of premixing with air) takes place in the rich combustion region, and completely premixed combustion takes place in the lean combustion region.

Another example of the rich-lean combustion process is disclosed in Japanese Unexamined Patent Publication No. 1993-195822. The technology shown in this publication is based on a combustor of a gas turbine having a plurality of fuel nozzles. The fuel nozzles are divided into a plurality of groups, and the flow rate of fuel supplied to each group is controlled individually. In a low-load operating state, fuel is supplied only to the fuel nozzles of some of the groups. By this means, low-$NO_x$ premixed combustion can be performed up to a generally low load range. Also, the occurrence of unburned fuel in a low load state is prevented, and improvement in flame holding properties is achieved.

As is generally known, the relationship between the fuel-air ratio (equivalence ratio) and the amount of $NO_x$ generated is as shown in FIG. 11. At an equivalence ratio $\phi$ of about 1, a large amount of $NO_x$ is generated, and the amount of $NO_x$ generated is small in the lean region ($\phi<1$) or the rich region ($\phi>1$). According to the rich-lean combustion process, the amount of $NO_x$ generated can be decreased as a whole, because combustion is performed in the lean region ($\phi<1$) where the amount of $NO_x$ generated is small, and in the rich region ($\phi>1$) where the amount of $NO_x$ generated is similarly small.

Japanese Unexamined Patent Publication Nos. 1996-261465, 1999-14055, and 1995-12340 are other examples of related art documents.

The inventor is developing a gas turbine at a high pressure ratio (a pressure ratio of 25 or higher) in the 1,700° C. class. With the gas turbine having such a high pressure ratio, the temperature of air flowing into the combustor is very high (500 to 600° C.), and the temperature of a combustion gas supplied from the combustor into the turbine reaches 1,700° C.

With a conventional gas turbine, the pressure ratio is of the order of 20 to 21, and the temperature of air flowing into the combustor is of the order of 450° C., so that the temperature of a combustion gas supplied from the combustor into the turbine is of the order of 1,500° C.

In the gas turbine, the amount of fuel supplied to the combustor is varied according to load. That is, as shown in FIG. 4(*e*), when load is increased, the amount of fuel supplied to the combustor is increased. Conversely, the amount of fuel supplied to the combustor is small in a speed increasing state (during a period from the stoppage of the gas turbine until the time when the speed is increased to a rated speed) or in a low load state.

With the gas turbine at a high pressure ratio (a pressure ratio of 25 or higher) in the 1,700° C. class, the capacity of the combustor is high. Thus, if the amount of fuel supplied is decreased in the speed increasing state or in the low load state, the concentration of a fuel gas (a mixture of fuel and air) is too low, meaning an excessively lean state. If the fuel gas is too lean, the flame holding properties may deteriorate, and unburned fuel may occur in a large amount, causing a decrease in the combustion efficiency.

The present invention has been accomplished in light of the above-described problems with the earlier technologies. An object of the invention is to provide a combustor of a gas turbine and a combustion control method for a gas turbine which can ensure stable combustion and suppress the occurrence of unburned fuel even in a gas turbine at a high pressure ratio currently under development.

SUMMARY OF THE INVENTION

A first aspect of the present invention is a combustor of a gas turbine, the combustor comprising an inner tube and a transition pipe connected together, wherein an internal swirler comprising a cylindrical internal swirler ring disposed concentrically with respect to a central axis of the inner tube, and a plurality of internal swirler vanes provided on an outer peripheral surface of the internal swirler ring, and an external swirler comprising a cylindrical external swirler ring disposed on an outer peripheral side of the internal swirler vanes and concentrically with respect to the internal swirler ring, and a plurality of external swirler vanes provided on an outer peripheral surface of the external swirler ring are arranged inside the inner tube to form internal divisional fluid passages defined by the internal swirler ring, the external swirler ring, and the plurality of the internal swirler vanes, and external divisional fluid passages defined by the external swirler ring, the inner tube, and the plurality of the external swirler vanes, the internal divisional fluid passages are divided into a first group consisting of a plurality of the divisional fluid passages arranged sequentially in a circumferential direction, and a second group consisting of a plurality of the divisional fluid passages arranged sequentially in the circumferential direction, a fuel injection hole for injecting fuel into the internal divisional fluid passages is formed in a vane surface of each of the internal swirler vanes, and a fuel injection hole for injecting fuel into the external divisional fluid passages is formed in a vane surface of each of the external swirler vanes, and the combustor further comprising first fuel supply means for supplying fuel to the fuel injection holes facing the internal divisional fluid passages of the first group among the fuel injection holes formed in the internal swirler vanes, second fuel supply means for supplying fuel to the fuel injection holes facing the internal divisional fluid passages of the second group among the fuel injection holes formed in the internal swirler vanes, and third fuel supply means for supplying fuel to the fuel injection holes formed in the external swirler vanes.

In the combustor of a gas turbine according to the present invention, at a rear edge of the inner tube, blocking members for inhibiting outflow of a fluid may be disposed in boundary portions between the divisional fluid passages of the first group and the divisional fluid passages of the second group;

of the fuel injection holes formed in the internal swirler vanes, the fuel injection holes facing the internal divisional fluid passages, which are among the internal divisional fluid passages of the first group and which are adjacent to the divisional fluid passages of the second group, may have larger hole diameters than the hole diameters of the other fuel injection holes; or a rear edge of each of the internal swirler vanes maybe flattened, and a fuel injection hole for injecting fuel may be formed in the rear edge of each of the internal swirler vanes.

A second aspect of the present invention is a combustion control method for a gas turbine, applied to the above-described combustor of a gas turbine and comprising:

presetting a speed increasing state, and also presetting a low load state, a medium load state, a high load state, and an ultrahigh load state sequentially in accordance with an increase in load;

injecting fuel from the first fuel supply means, the fuel being in such an amount as to bring about a lean state, through the fuel injection holes facing the internal divisional fluid passages of the first group in the speed increasing state and in the low load state;

injecting fuel from the first fuel supply means, the fuel being in such an amount as to bring about a lean state, through the fuel injection holes facing the internal divisional fluid passages of the first group in the medium load state, and also injecting fuel from the second fuel supply means, the fuel being in such an amount as to bring about a lean state, through the fuel injection holes facing the internal divisional fluid passages of the second group in the medium load state;

injecting fuel from the first fuel supply means, the fuel being in such an amount as to bring about a lean state, through the fuel injection holes facing the internal divisional fluid passages of the first group in the high load state, also injecting fuel from the second fuel supply means, the fuel being in such an amount as to bring about a lean state, through the fuel injection holes facing the internal divisional fluid passages of the second group in the high load state, and further injecting fuel from the third fuel supply means, the fuel being in such an amount as to bring about a lean state, through the fuel injection holes facing the external divisional fluid passages in the high load state; and injecting fuel from the first fuel supply means, the fuel being in such an amount as to bring about a rich state, through the fuel injection holes facing the internal divisional fluid passages of the first group in the ultrahigh load state, also injecting fuel from the second fuel supply means, the fuel being in such an amount as to bring about a rich state, through the fuel injection holes facing the internal divisional fluid passages of the second group in the ultrahigh load state, and further injecting fuel from the third fuel supply means, the fuel being in such an amount as to bring about a lean state, through the fuel injection holes facing the external divisional fluid passages in the ultrahigh load state.

In the present invention, when the total amount of fuel supplied to the combustor is small as in a speed increasing state or a low load state, fuel is injected only from the fuel injection holes facing the divisional fluid passages of the first group among the fuel injection holes formed in the vane surfaces of the internal swirler vanes. Thus, the concentration of fuel in this limited region does not become excessively low, but becomes higher than the flammability limit concentration. Even in the speed increasing state or low load state, therefore, the occurrence of unburned fuel can be suppressed, and flame holding performance can be improved.

Moreover, the blocking members for inhibiting outflow of a fluid are disposed in boundary portions between the divisional fluid passages of the first group and the divisional fluid passages of the second group. Thus, flame holding performance can be further improved, and the occurrence of unburned fuel between the first group and the second group in the low load state can be decreased.

Furthermore, of the fuel injection holes formed in the internal swirler vanes, the fuel injection holes facing the internal divisional fluid passages, which are among the internal divisional fluid passages of the first group and which are adjacent to the divisional fluid passages of the second group, have larger hole diameters than the hole diameters of the other fuel injection holes. By so doing, the occurrence of unburned fuel in the low load state can be further suppressed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a longitudinal sectional view showing a combustor according to Embodiment 3 of the present invention;

DETAILED DESCRIPTION OF THE INVENTION

The best mode for carrying out the present invention will be described in detail based on the following embodiments.

Embodiment 1

A combustor 100 of a gas turbine according to Embodiment 1 of the present invention is described with reference to FIG. 1 as a longitudinal sectional view, and FIG. 2 as a front view. The combustor 100 according to this Embodiment 1 is applied to a gas turbine at a high pressure ratio (a pressure ratio of 25 or higher) in the 1700° C. class being newly developed.

Figure 1:
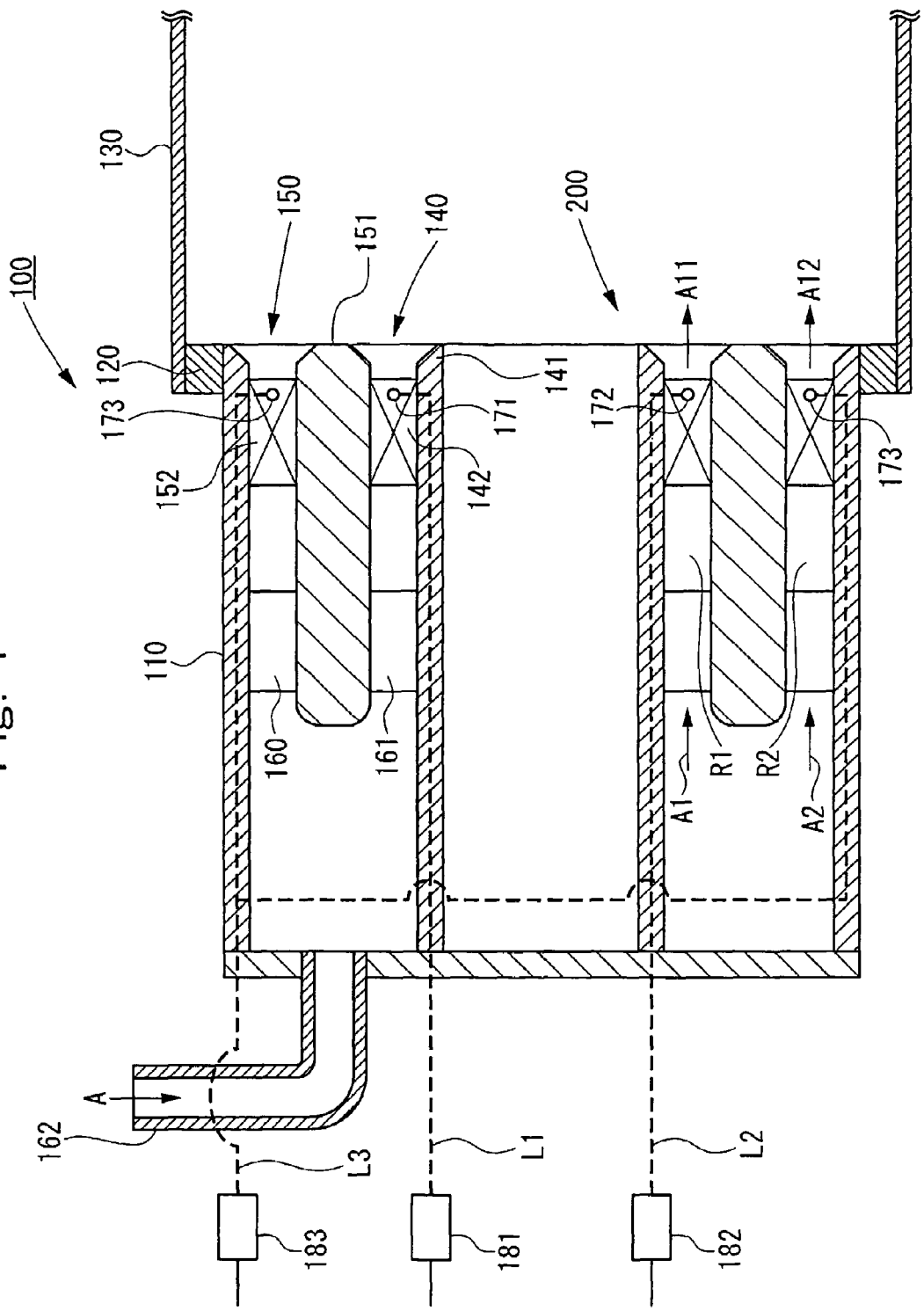
FIG. 1 is a longitudinal sectional view showing a combustor according to Embodiment 1 of the present invention.
Figure 2:
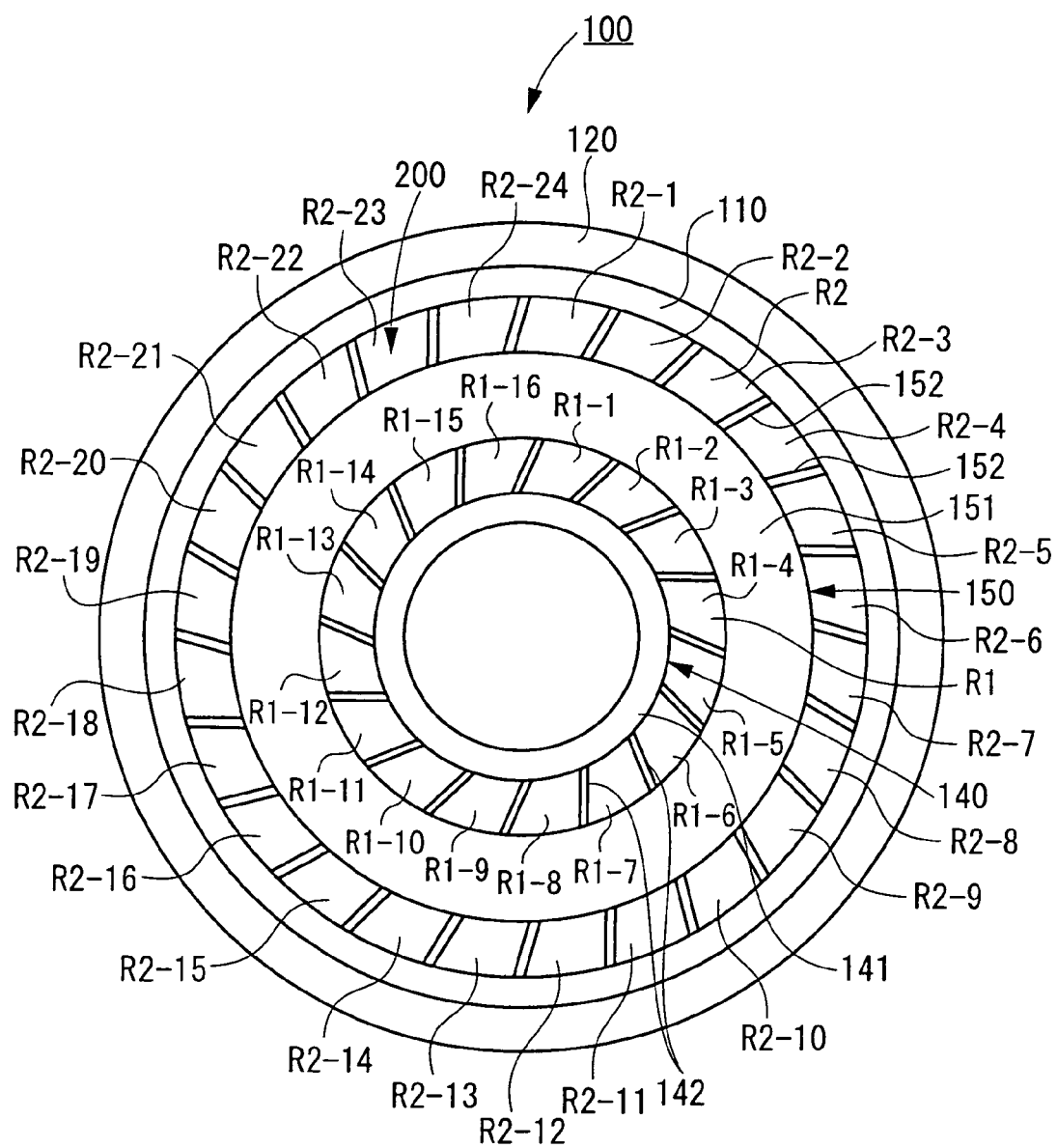
FIG. 2 is a front view showing the combustor according to the Embodiment 1.

As shown in FIGS. 1 and 2, the rear edge of an inner tube 110 is connected to the leading edge of a transition pipe 130 via a connecting ring 120.

Inside the inner tube 110, an internal swirler 140 and an external swirler 150 are placed. That is, the internal swirler 140 on the inner peripheral side and the external swirler 150 on the outer peripheral side are disposed concentrically about the central axis of the inner tube 110. The internal swirler 140 and the external swirler 150 constitute a double swirler 200.

A swirler ring 141 of the internal swirler 140 is of a cylindrical shape, and is disposed concentrically with respect to the central axis of the inner tube 110. Many (16 in the present embodiment) swirler vanes 142 are provided on the outer peripheral surface of the cylindrical swirler ring 141. The swirler vanes 142 are arranged at equally spaced positions along the circumferential direction of the outer peripheral surface of the swirler ring 141, and are installed to be curved while extending in the axial direction of the swirler ring 141. The swirler vanes 142 swirl compressed air flowing through the interior of the inner tube 110 (flowing from the left side to the right side in FIG. 1) to convert the compressed air into a swirl air flow A11.

A swirler ring 151 of the external swirler 150 is of a cylindrical shape, and is disposed on the outer peripheral side of the swirler vanes 142 and concentrically with respect to the swirler ring 141. Many (24 in the present embodiment) swirler vanes 152 are provided on the outer peripheral surface of the cylindrical swirler ring 151. The swirler vanes 152 are arranged at equally spaced positions along the circumferential direction of the outer peripheral surface of the swirler ring 151, and are installed to be curved while extending in the axial direction of the swirler ring 151. The swirler vanes 152 swirl compressed air flowing through the interior of the inner tube 110 (flowing from the left side to the right side in FIG. 1) to convert the compressed air into a swirl air flow A12.

The swirler ring 151 of the external swirler 150 is connected to and fixed to the inner peripheral surface of the inner tube 110 via a plurality of coupling members 160 arranged at spaced locations in the circumferential direction. The swirler ring 141 of the internal swirler 140 is connected to and fixed to the inner peripheral surface of the swirler ring 151 via a plurality of coupling members 161 arranged at spaced locations in the circumferential direction.

Because of the above-described configuration, a fluid passage R1 is formed between the outer peripheral surface of the swirler ring 141 located internally and the inner peripheral surface of the swirler ring 151 located externally. Also, a fluid passage R2 is formed between the outer peripheral surface of the swirler ring 151 located externally and the inner peripheral surface of the inner tube 110.

Compressed air A is supplied to the inside space of the inner tube 110 via an air inflow pipe 162. The compressed air A flows from the left side toward the right side in FIG. 1 (flows from the position of placement of the air inflow pipe 162 toward the transition pipe 130), and then flows in the inner tube 110 in such a manner as to be divided into compressed air A1 flowing through the fluid passage R1 and compressed air A2 flowing through the fluid passage R2.

The compressed air A1 flowing through the fluid passage R1 is swirled by the swirler vanes 142, thereby converted into a swirl air flow A11, and blown out from the rear edge of the internal swirler 140.

The compressed air A2 flowing through the fluid passage R2 is swirled by the swirler vanes 152, thereby converted into a swirl air flow A12, and blown out from the rear edge of the external swirler 150.

The fluid passage R1 formed between the outer peripheral surface of the internal swirler ring 141 and the inner peripheral surface of the external swirler ring 151 is partitioned by the swirler vanes 142 at a plurality of locations along the circumferential direction. The individual fluid passages thus partitioned off are designated as divisional fluid passages R1-1 to R1-8 and R1-9 to R1-16.

In the present embodiment, the divisional fluid passages R1-1 to R1-8 arranged sequentially in the circumferential direction are called the divisional fluid passages of the first group, while the divisional fluid passages R1-9 to R1-16 arranged sequentially in the circumferential direction are called the divisional fluid passages of the second group.

These fluid passages can also be divided into 3 or more groups consisting of the divisional fluid passages arranged sequentially in the circumferential direction.

The fluid passage R2 formed between the outer peripheral surface of the external swirler ring 151 and the inner peripheral surface of the inner tube 110 is partitioned by the swirler vanes 152 at a plurality of locations along the circumferential direction. The individual fluid passages thus partitioned off are designated as divisional fluid passages R2-1 to R2-24.

Of the vane surfaces (vane ventral surface and vane dorsal surface) of the respective vanes on the swirler ring 141 of the internal swirler 140, those facing the divisional fluid passages R1-1 to R1-8 of the first group have, formed therein, fuel injection holes 171 of a first group which inject fuel (see FIG. 1). The fuel injection holes 171 blow off fuel toward the swirl air flow A11 flowing through the divisional fluid passages R1-1 to R1-8 of the first group.

Of the vane surfaces (vane ventral surface and vane dorsal surface) of the respective vanes on the swirler ring 141 of the internal swirler 140, those facing the divisional fluid passages R1-9 to R1-16 of the second group have, formed therein, fuel injection holes 172 of a second group which inject fuel (see FIG. 1). The fuel injection holes 172 blow off fuel toward the swirl air flow A11 flowing through the divisional fluid passages R1-9 to R1-16 of the second group.

Furthermore, of the vane surfaces (vane ventral surface and vane dorsal surface) of the respective vanes on the swirler ring 151 of the external swirler 150, those facing the divisional fluid passages R2-1 to R2-24 have, formed therein, fuel injection holes 173 of a third group which inject fuel (see FIG. 1). The fuel injection holes 173 blow off fuel toward the swirl air flow A12 flowing through the divisional fluid passages R2-1 to R2-24.

The fuel injection holes 171 of the first group are supplied with fuel via a fuel supply piping L1. The fuel injection holes 172 of the second group are supplied with fuel via a fuel supply piping L2. The fuel injection holes 173 of the third group are supplied with fuel via a fuel supply piping L3.

A flow control portion 181 equipped with a shut-off valve and a flow control valve is interposed in the fuel supply piping L1. A flow control portion 182 equipped with a shut-off valve and a flow control valve is interposed in the fuel supply piping L2. A flow control portion 183 equipped with a shut-off valve and a flow control valve is interposed in the fuel supply piping L3.

The opening and closing and the opening adjustment of the flow control portions 181, 182, 183 are performed by a control device (not shown).

Figure 3:
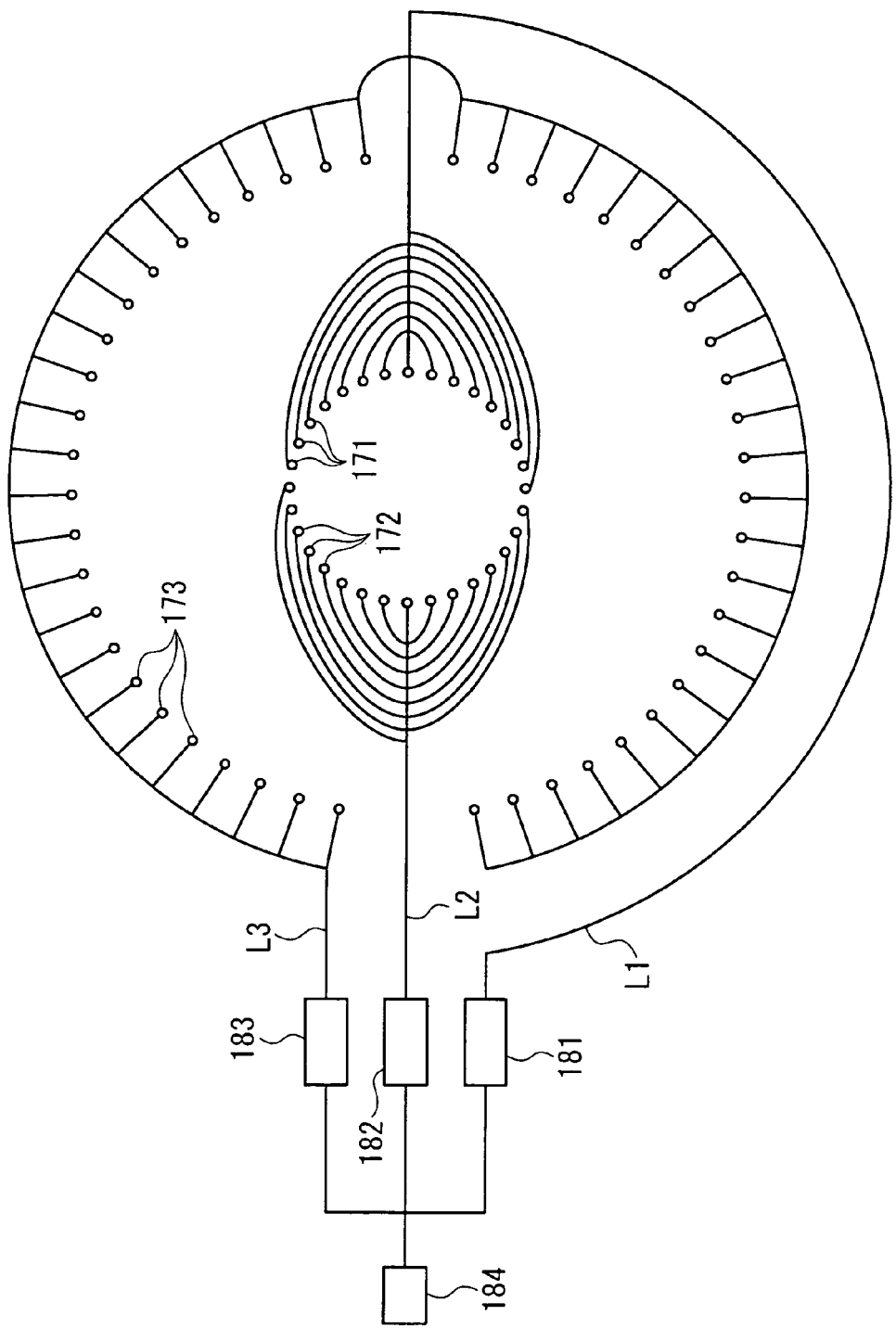
FIG. 3 is a schematic view showing a fuel supply system in the Embodiment 1.
Figure 4A:
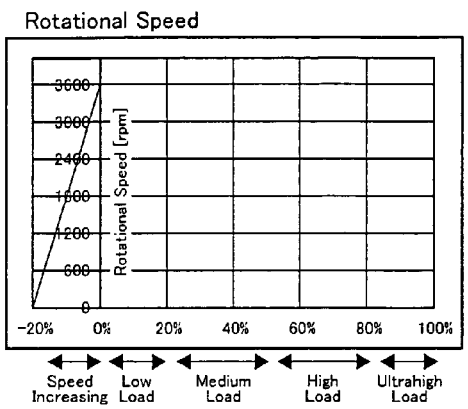
FIGS. 4(a) to 4(e) are characteristic views showing fuel control characteristics in the Embodiment 1.
Figure 4B:
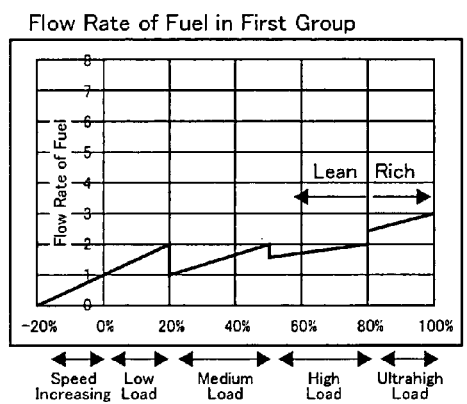
Figure 4C:
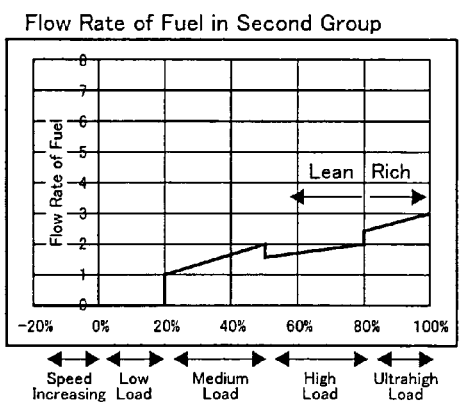
Figure 4D:
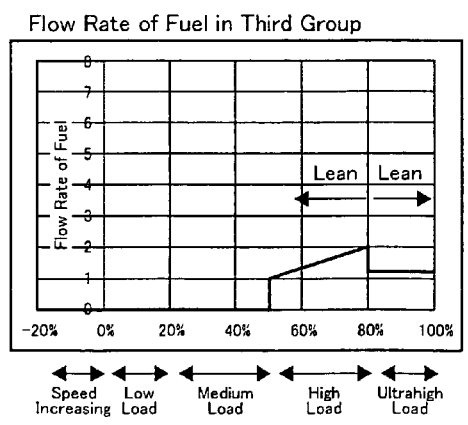
Figure 4E:
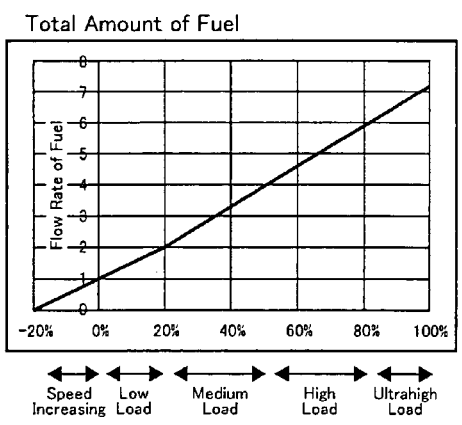

FIG. 3 schematically shows a fuel supply system. In FIG. 3, the numeral 184 denotes a fuel source, and fuel is pressure-fed from the fuel source 184.

Next, an explanation will be offered for a combustion control method in the combustor 100 having the above-described features.

First, characteristic views concerned with the combustion control method are described.

In the various characteristics of the present embodiment, low load means load of 0% to about 20%, medium load means load of about 20% to about 50%, high load means load of about 50% to about 80%, and ultrahigh load means load of about 80% to 100%.

FIG. 4(*a*) is a graph of characteristics showing the relationship between the rotational speed of and the load on a gas turbine equipped with the combustor 100. The rated rotational speed of the gas turbine is 3,600 rpm in the present embodiment.

FIG. 4(*b*) is a graph of characteristics showing the relationship between the load and the amount of fuel supplied via the fuel supply piping L1 of the combustor 100 and injected through the fuel injection holes 171 of the first group.

FIG. 4(*c*) is a graph of characteristics showing the relationship between the load and the amount of fuel supplied via the fuel supply piping L2 of the combustor 100 and injected through the fuel injection holes 172 of the second group.

FIG. 4(*d*) is a graph of characteristics showing the relationship between the load and the amount of fuel supplied via the fuel supply piping L3 of the combustor 100 and injected through the fuel injection holes 173 of the third group.

FIG. 4(*e*) is a graph of characteristics showing the relationship between the load and the total amount of fuel supplied to the combustor 100 via the fuel supply pipings L1, L2 and L3. As shown in FIG. 4(*e*), the total amount of fuel increases linearly with an increase in load. The total amount of fuel shown in FIG. 4(*e*) is the sum of the fuel amounts of the first group to the third group shown in FIGS. 4(*b*) to 4(*d*).

FIG. 5(*a*) is a graph of characteristics showing the relationship between the load and the pressure inside the casing of the gas turbine provided with the combustor 100. The pressure inside the casing of the turbine increases nearly linearly with an increase in load.

FIG. 5(*b*) is a graph of characteristics showing the relationship between the load and the outlet temperature of the combustor. When the load is about 80%, the temperature of a combustion gas exiting from the combustor 100 is 1,500° C. When the load is 100%, the temperature of the combustion gas exiting from the combustor 100 is 1,700° C.

Next, the combustion control method in respective states ranging from a speed-increasing state to an ultrahigh load state will be described.

As shown in FIGS. 4(*a*) to 4(*e*), during the period from the speed increasing state to the low load state, fuel commensurate with the load is supplied to the fuel injection holes 171 of the first group via the fuel supply piping L1, and this fuel is injected through the fuel injection holes 171 of the first group, by making flow rate adjustment in the flow control portion 181.

At this time, the flow control portions 182 and 183 are closed to refrain from injecting fuel through the fuel injection holes 172 and 173 of the second and third groups.

Thus, fuel is injected only into the swirl air flow A11 which has passed through the divisional fluid passages R1-1 to R1-8 of the first group. As a result, the swirl air flow A11, which has passed through the divisional fluid passages R1-1 to R1-8, and the injected fuel are mixed to form a fuel gas, and the fuel gas is burned.

The fuel gas formed by mixing of the swirl air flow A11, which has passed through the divisional fluid passages R1-1 to R1-8, and the injected fuel is lean, but is higher in concentration than the flammability limit concentration (or "ignition limit concentration"). Incidentally, the flammability limit concentration (or "ignition limit concentration") refers to the limiting concentration (leanness) of the fuel gas below which combustion (or ignition) is impossible.

As described above, in the speed increasing state and the low load state, the total amount of fuel injected is small, but this fuel is injected only into the swirl air flow A11 which has passed through the divisional fluid passages R1-1 to R1-8 of the first group. Thus, the resulting fuel gas is lean, but has a higher concentration than the flammability limit concentration. Consequently, the flame holding properties can be ensured, and the occurrence of unburned fuel is markedly decreased.

By so limiting the region, where fuel is injected, to a part of the internal fluid passage R1 (i.e., the divisional fluid passages R1-1 to R1-8) even in the speed increasing state and the low load state in which the total amount of fuel supplied to the combustor 100 is small, it becomes possible to ensure the flame holding performance and suppress the occurrence of unburned fuel. This is one of the technical points of the present embodiment.

Assume that, in the speed increasing state and the low load state, fuel is injected to all of the internal fluid passage R1 (i.e., not only the divisional fluid passages R1-1 to R1-8 of the first group, but also the divisional fluid passages R1-9 to R1-18 of the second group). In this case, the concentration of the resulting fuel gas is lower than the flammability limit concentration. As a result, oscillating combustion may occur, or unburned fuel may be generated.

In the medium load state, flow rate adjustment in the flow control portion 181 and the flow control portion 182 is made, whereby fuel commensurate with the load is supplied to the fuel injection holes 171 of the first group and the fuel injection holes 172 of the second group via the fuel supply piping L1 and the fuel supply piping L2, and this fuel is injected through the fuel injection holes 171 of the first group and the fuel injection holes 172 of the second group.

At this time, the flow control portion 183 is closed to refrain from injecting fuel through the fuel injection holes 173 of the third group.

Thus, fuel is injected into the swirl air flow A11 which has passed through the divisional fluid passages R1-1 to R1-8 and R1-9 to R1-16 of the first and second groups. As a result, the swirl air flow A11, which has passed through the divisional fluid passages R1-1 to R1-8 and R1-9 to R1-16, and the injected fuel are mixed to form a fuel gas, and the fuel gas is burned.

The fuel gas formed by mixing of the swirl air flow A11, which has passed through the divisional fluid passages R1-1 to R1-8 and R1-9 to R1-16, and the injected fuel is lean, but is higher in concentration than the flammability limit concentration (or "ignition limit concentration"). Thus, satisfactory combustion can be performed.

In the high load state, flow rate adjustment in the flow control portion 181, the flow control portion 182, and further the flow control portion 183 is made, whereby fuel commensurate with the load is supplied to the fuel injection holes 171 of the first group and the fuel injection holes 172 of the second group and further the fuel injection holes 173 of the third group via the three fuel supply pipings L1 to L3, and this fuel is injected through the fuel injection holes 171, 172 and 173 of the first to third groups.

Thus, fuel is injected not only into the swirl air flow A11, which has passed through the divisional fluid passages R1-1 to R1-8 and R1-9 to R1-16 of the first and second groups, but also into the swirl air flow A12 which has passed through the divisional fluid passages R2-1 to R2-24 of the third group. As a result, the swirl air flows A11, A12, which have passed through the divisional fluid passages R1-1 to R1-8, R1-9 to R1-16, R2-1 to R2-24, and the injected fuel are mixed to form a fuel gas, and the fuel gas is burned.

The fuel gas formed by mixing of the swirl air flows A11, A12, which have passed through the divisional fluid passages R1-1 to R1-8, R1-9 to R1-16, R2-1 to R2-24, and the injected fuel is lean, but is higher in concentration than the flammability limit concentration (or "ignition limit concentration"). Thus, satisfactory combustion can be performed.

Figure 5A:
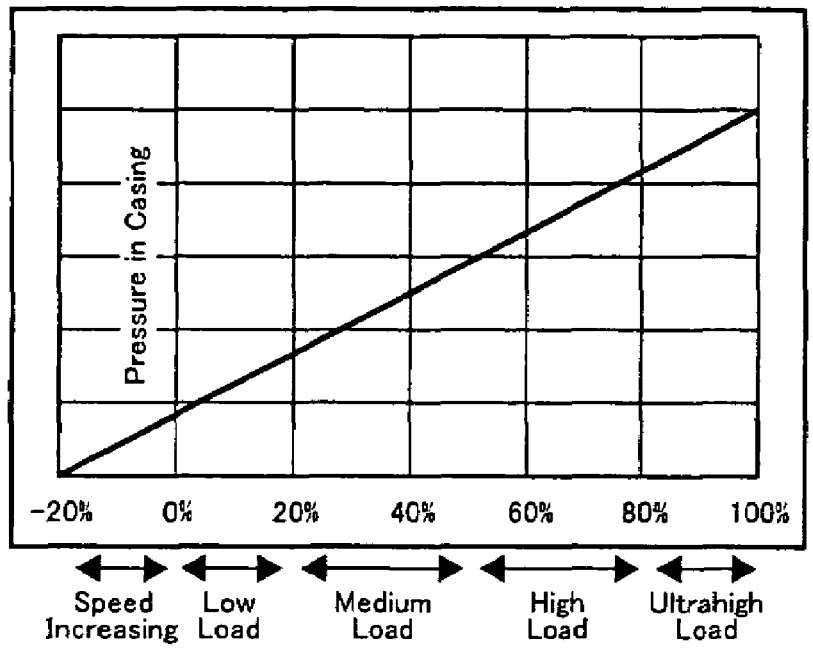
FIGS. 5(a) and 5(b) are characteristic views showing pressure characteristics and temperature characteristics in the Embodiment 1.
Figure 5B:
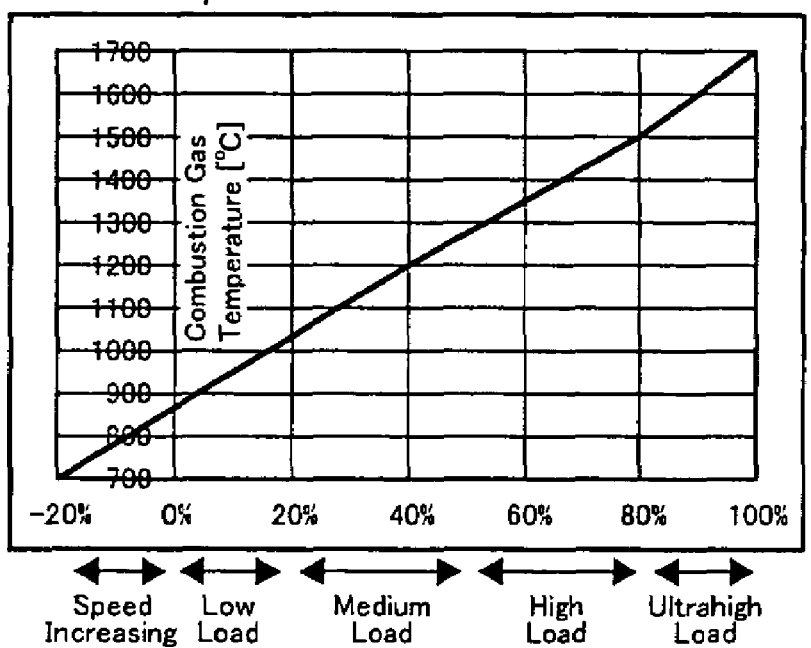

In the ultrahigh load state, the pressure in the casing is high, and the outlet temperature of the combustor exceeds 1,500° C., as shown in FIGS. 5(a), 5(b). In this ultrahigh load state, flow rate adjustment in the flow control portion 181, the flow control portion 182, and further the flow control portion 183 is made, whereby fuel commensurate with the load is supplied to the fuel injection holes 171 of the first group and the fuel injection holes 172 of the second group and further the fuel injection holes 173 of the third group via the three fuel supply pipings L1 to L3, and this fuel is injected through the fuel injection holes 171, 172 and 173 of the first to third groups.

Thus, fuel is injected not only into the swirl air flow A11, which has passed through the divisional fluid passages R1-1 to R1-8 and R1-9 to R1-16 of the first and second groups, but also into the swirl air flow A12 which has passed through the divisional fluid passages R2-1 to R2-24 of the third group. As a result, the swirl air flows A11, A12, which have passed through the divisional fluid passages R1-1 to R1-8, R1-9 to R1-16, R2-1 to R2-24, and the injected fuel are mixed to form a fuel gas, and the fuel gas is burned.

Furthermore, flow rate adjustment by the flow control portions 181 to 183 is made, whereby the amount of fuel injected is adjusted such that the fuel gas exiting from the divisional fluid passages R1-1 to R1-8 and R1-9 to R1-16 on the inner peripheral side is rendered rich, whereas the fuel gas exiting from the divisional fluid passages R2-1 to R2-24 on the outer peripheral side is rendered lean.

Consequently, rich combustion takes place on the inner peripheral side (middle side), and lean combustion takes place on the outer peripheral side, meaning that rich-lean combustion can be performed. Accordingly, the flame holding properties can be ensured, with the decrease in $NO_x$ being achieved.

Embodiment 2

Figure 6:
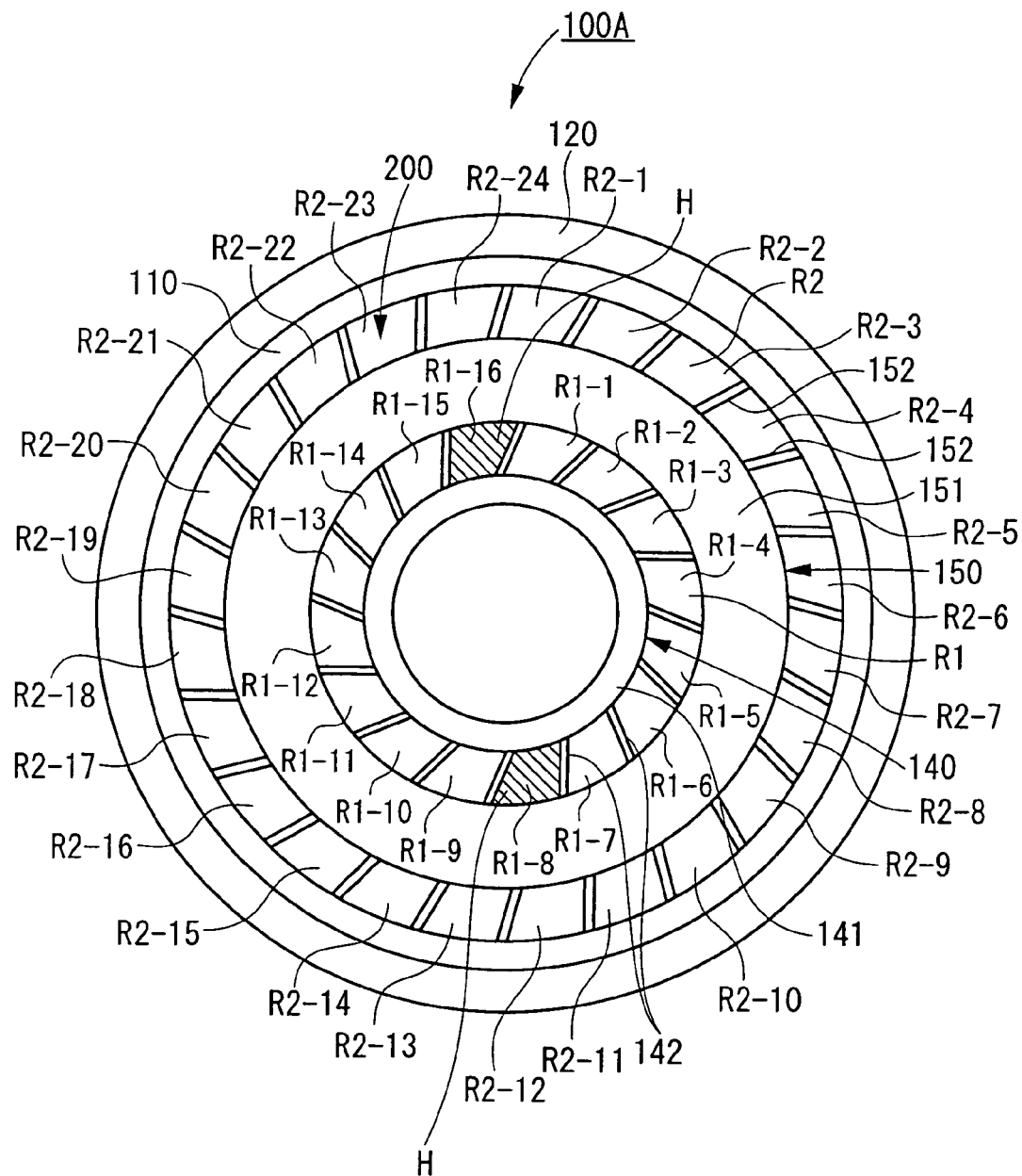
FIG. 6 is a front view showing a combustor according to Embodiment 2 of the present invention.

Next, a combustor 100A of a gas turbine according to Embodiment 2 of the present invention will be described with reference to FIG. 6 as a front view.

In the combustor 100A of Embodiment 2, blocking members H for decreasing the flow areas of the divisional fluid passage R1-8 and the divisional fluid passage R1-16 are provided at the rear edge of the divisional fluid passages R1-8 and R1-16.

In other words, at the rear edge of the inner tube 110, the blocking members H for inhibiting the outflow of a fluid are disposed at the boundary portions between the divisional fluid passages R1-1 to R1-8 of the first group and the divisional fluid passages R1-9 to R1-16 of the second group.

Thus, the swirl air flow A11 exiting from the divisional fluid passages R1-1 to R1-7 of the first group, and the swirl air flow A12 exiting from the divisional fluid passages R1-9 to R1-15 of the second group are not mixed in the neighborhood of the rear end of the inner tube 110 (the downstream end portion along the flowing direction of air) because of the presence of the blocking members H, but are mixed when they are apart by a certain distance from the rear end of the inner tube 110.

The features of the other portions and the combustion control method are the same as those in Embodiment 1.

According to this Embodiment 2, in the speed increasing state and the low load state, the fuel gas exiting from the divisional fluid passages R1-1 to R1-7 of the first group, and the swirl air flow exiting from the divisional fluid passages R1-9 to R1-15 of the second group are not mixed in the neighborhood of the rear end of the inner tube 110 because of the presence of the blocking members H. Thus, the fuel gas exiting from the divisional fluid passages R1-1 to R1-7 of the first group is not diluted with the swirl air flow exiting from the divisional fluid passages R1-9 to R1-15 of the second group, but can be burned at a concentration equal to or higher than the flammability limit concentration.

Accordingly, the occurrence of unburned fuel can be suppressed more effectively.

Besides, in the neighborhood of the rear end of the blocking member H, the flow velocity of air is so low that air whirls. Thus, the effect is exhibited that at this site, flames are held, resulting in improved flame holding properties.

In addition, the vane thickness of the swirler vane 142 located between the divisional fluid passage R1-1 and the divisional fluid passage R1-16, and the vane thickness of the swirler vane 142 located between the divisional fluid passage R1-8 and the divisional fluid passage R1-9 may be increased, whereby the thickened swirler vanes 142 can be allowed to function as the blocking members.

Embodiment 3

Next, a combustor 100B of a gas turbine according to Embodiment 3 of the present invention will be described with reference to FIG. 7 as a longitudinal sectional view. This Embodiment 3 has the same basic configuration and uses the same combustion control method as those in Embodiment 1.

In the Embodiment 3, of the fuel injection holes 171 of the first group, the fuel injection holes 171 facing the divisional fluid passage R1-1 and the divisional fluid passage R1-8 have larger hole diameters. That is, the fuel injection holes 171 facing the divisional fluid passages R1-1 and R1-8 adjacent to the divisional fluid passages R1-9 to R1-16 of the second group among the divisional fluid passages R1-1 to R1-8 of the first group have larger hole diameters.

In the first group, therefore, the concentration of the fuel gas exiting from the divisional fluid passages R1-1 and R1-8 is higher than the concentration of the fuel gas exiting from the divisional fluid passages R1-2 to R1-7.

Consequently, even if the fuel gas of a relatively high concentration, which has exited from the divisional fluid passage R1-1 and the divisional fluid passage R1-8, and the swirl air flow, which has exited from the divisional fluid passages R1-9 to R1-16 of the second group, are mixed in the speed increasing state or the low load state, the so mixed fuel gas can be maintained at a concentration equal to or higher than the flammability limit concentration. Thus, satisfactory combustion can be performed, without occurrence of unburned fuel.

Figure 8A:
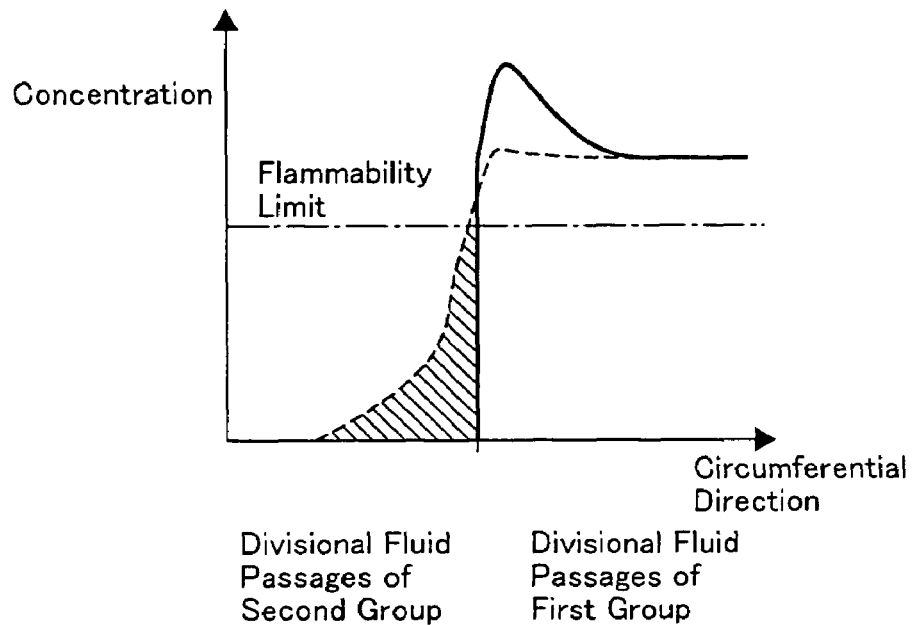
FIGS. 8(a) and 8(b) are characteristic views showing the fuel injection characteristics of the combustor according to the Embodiment 3.

The characteristics indicated by a solid line in FIG. 8(a) represent the concentration of the fuel gas in Embodiment 3 at the boundary position between the divisional fluid passages R1-1 to R1-8 of the first group and the divisional fluid passages R1-9 to R1-16 of the second group with respect to the circumferential direction, and at the position directly below the inner tube 110 with respect to the flowing direction of air (i.e., the upstream position α). The area of the hatching in the drawing represents the amount of occurrence of unburned fuel.

The characteristics indicated by a dashed line in FIG. 8(a) represent the concentration of the fuel gas in Embodiment 3 at the boundary position between the divisional fluid passages R1-1 to R1-8 of the first group and the divisional fluid passages R1-9 to R1-16 of the second group with respect to the circumferential direction, and at a position apart from the inner tube 110 with respect to the flowing direction of air (i.e., the downstream position β). The area of the hatching in the drawing represents the amount of occurrence of unburned fuel.

Figure 8B:
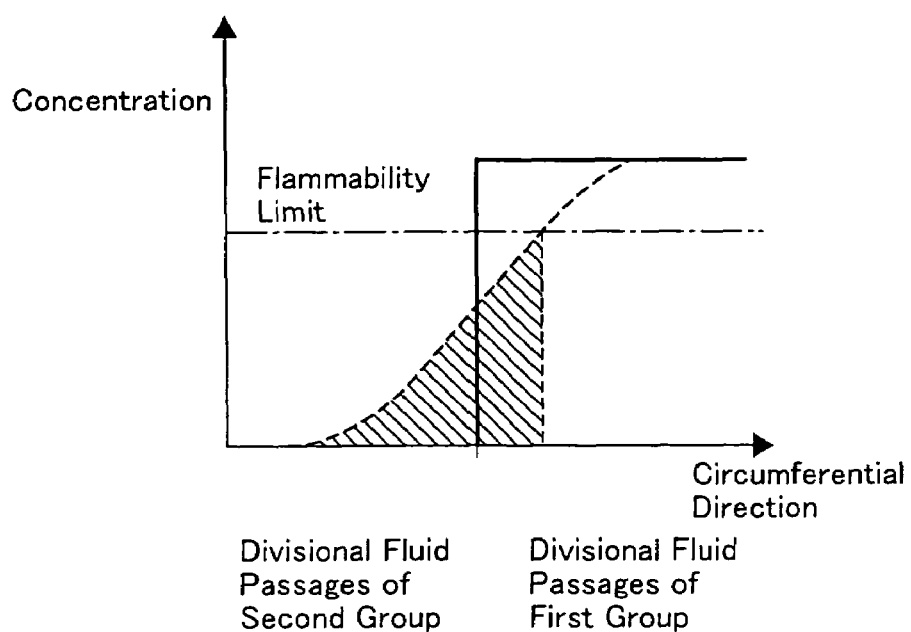

Incidentally, FIG. 8(b) shows similar characteristics in a case where the hole diameters of all the fuel injection holes 171 are rendered equal.

A comparison between FIG. 8(a) and FIG. 8(b) shows that the amount of occurrence of unburned fuel can be decreased more effectively in Embodiment 3.

Embodiment 4

Figure 9A:
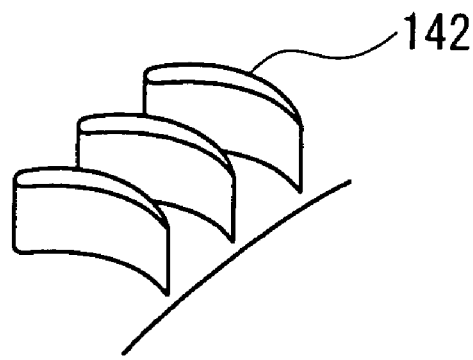
FIGS. 9(a) and 9(b) are perspective views showing essential parts of a combustor according to Embodiment 4 of the present invention.
Figure 9B:
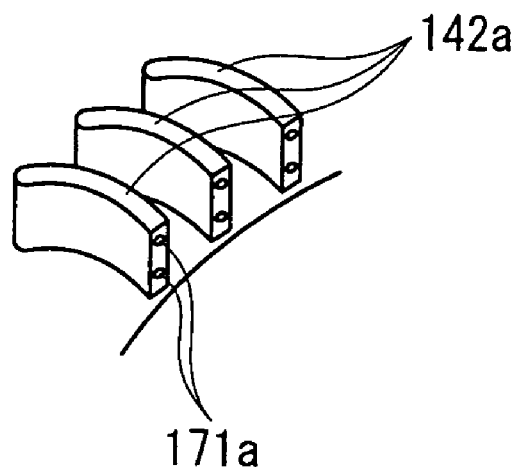
Figure 10:
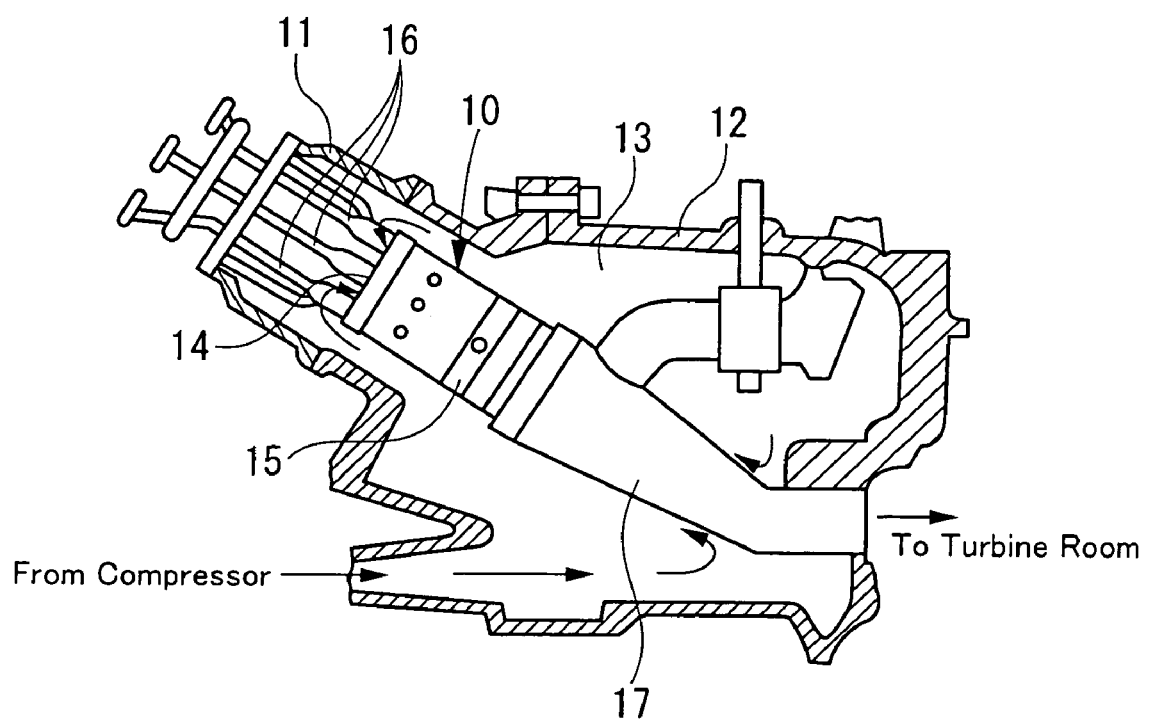
FIG. 10 is a configurational drawing showing a conventional combustor.
Figure 11:
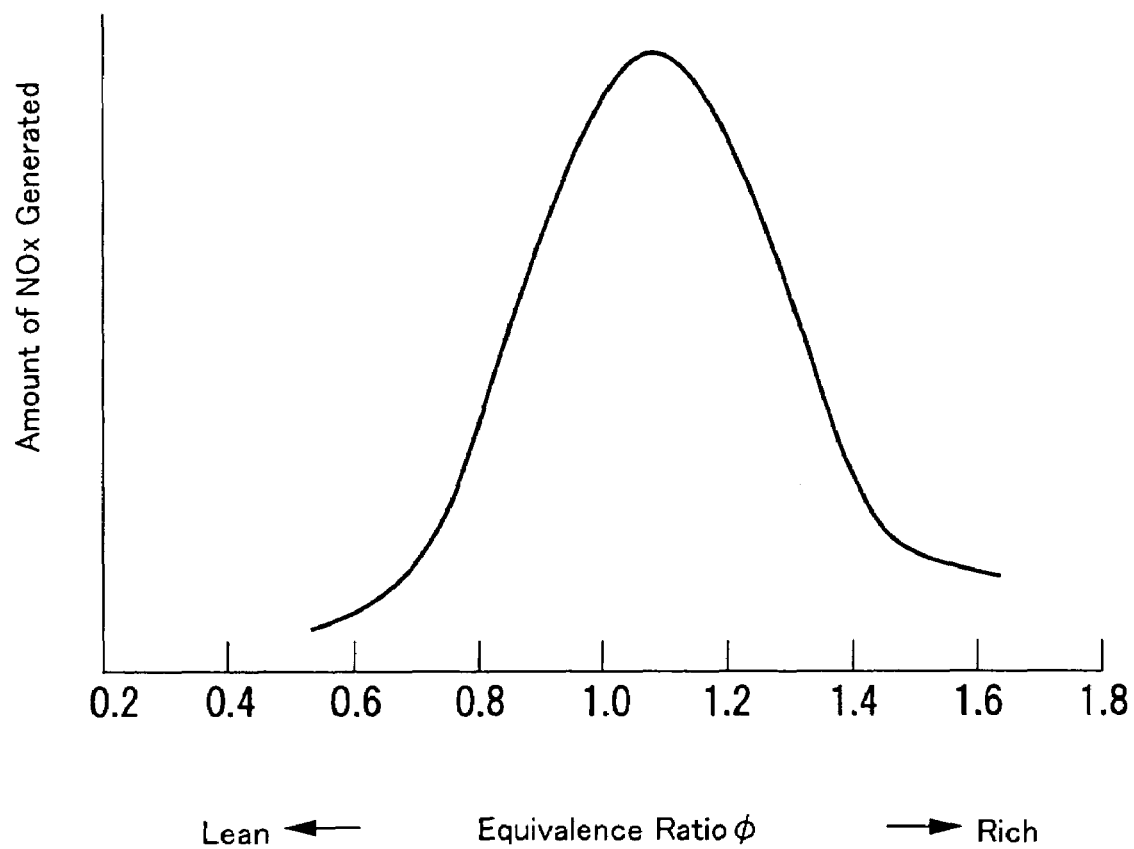
FIG. 11 is a characteristic view showing the relationship between an equivalence ratio and the amount of $NO_x$ generated.

In the above-described Embodiment 1 to Embodiment 3, the swirler vane 142 of the internal swirler 140 has a shape in which the vane thickness progressively decreases toward the rear edge portion, presenting a tapered pointed shape, as shown in FIG. 9(a), although this is not explicitly described. In Embodiment 4, the swirler vane 142 of the internal swirler 140 has a flat rear edge, as shown in FIG. 9(b).

Besides, fuel injection holes 171a for injecting fuel only in a speed increasing state and in a low load state are provided at the flattened rear edge of the swirler vane 142a. The fuel injection holes 171a are supplied with fuel via the fuel supply piping L1.

In Embodiment 4, fuel is injected through the fuel injection holes 171a in the speed increasing state and the low load state. This injected fuel at a high concentration is burned to form jet flames, which approach the rear edge of the combustor 100. Thus, unsatisfactory flame holding or an increase in unburned fuel due to leanness of fuel in the speed increasing state or in the low load state can be suppressed more effectively.

Furthermore, the rear edge portion of the swirler vane 142a is flattened. Thus, the downstream region directly below this rear edge portion becomes a low flow velocity region, thereby producing the effect of improving flame holding properties for jet flames.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A combustor of a gas turbine, the combustor comprising an inner tube and a transition pipe connected together, wherein an internal swirler comprising a cylindrical internal swirler ring disposed concentrically with respect to a central axis of the inner tube, and a plurality of internal swirler vanes provided on an outer peripheral surface of the internal swirler ring, and an external swirler comprising a cylindrical internal swirler ring disposed on an outer peripheral side of the internal swirler vanes and concentrically with respect to the internal swirler ring, and a plurality of external swirler vanes provided on an outer peripheral surface of the external swirler ring are arranged inside the inner tube to form internal divisional fluid passages defined by the internal swirler ring, the external swirler ring, and the plurality of the internal swirler vanes, and external divisional fluid passages defined by the external swirler ring, the inner tube, and the plurality of the external swirler vanes, the internal divisional fluid passages are divided into a first group consisting of a plurality of the divisional fluid passages arranged sequentially in a circumferential direction, and a second group consisting of a plurality of the divisional fluid passages arranged sequentially in the circumferential direction, a fuel injection hole for injecting fuel into the internal divisional fluid passages is formed in a vane surface of each of the internal swirler vanes, and a fuel injection hole for injecting fuel into the external divisional fluid passages is formed in a vane surface of each of the external swirler vanes, and the combustor further comprising first fuel supply means for supplying fuel to fuel injection holes facing the internal divisional fluid passages of the first group among the fuel injection holes formed in the internal swirler vanes, second fuel supply means for supplying fuel to fuel injection holes facing the internal divisional fluid passages of the second group among the fuel injection holes formed in the internal swirler vanes, and third fuel supply means for supplying fuel to fuel injection holes formed in the external swirler vanes.

2. The combustor of a gas turbine according to claim 1, wherein at a rear edge of the inner tube, blocking members for inhibiting outflow of a fluid are disposed in boundary portions between the divisional fluid passages of the first group and the divisional fluid passages of the second group.

3. The combustor of a gas turbine according to claim 1, wherein of the fuel injection holes formed in the internal swirler vanes, the fuel injection holes facing the internal divisional fluid passages of the first group and which are adjacent to the divisional fluid passages of the second group, have larger hole diameters then the hole diameters of the other fuel injection holes.

4. The combustor of a gas turbine according to claim 1, wherein a rear edge of each of the internal swirler vanes is flattened and a fuel injection hole for injecting fuel is formed in the rear edge of each of the internal swirler vanes.

* * * * *